United States Patent
Graefe et al.

(10) Patent No.: US 9,650,083 B2
(45) Date of Patent: May 16, 2017

(54) SUBFRAME FOR A MOTOR VEHICLE AND METHOD FOR PRODUCING A SUBFRAME

(71) Applicants: BENTELER AUTOMOBILTECHNIK GMBH, Paderborn (DE); QUADRANT PLASTIC COMPOSITES AG, Lenzburg (CH)

(72) Inventors: Joachim Graefe, Wertheim (DE); Andreas Franzke, Paderborn (DE); Matthias Koerner, Bielefeld (DE); Alex Mirau, Hoevelhof (DE); Oliver Seibt, Paderborn (DE); Thomas Troester, Salzkotten (DE); Elmar Moritzer, Bad Lippspringe (DE); Christopher Budde, Detmold (DE); Simon Poehler, Osnabrueck (DE)

(73) Assignee: Benteler Automobiltechnik GMBH, Lenzburg (CH)

( * ) Notice: Subject to any disclaimer, the term of this patent is extended or adjusted under 35 U.S.C. 154(b) by 0 days.

(21) Appl. No.: 14/830,890

(22) Filed: Aug. 20, 2015

(65) Prior Publication Data

US 2016/0052564 A1   Feb. 25, 2016

(30) Foreign Application Priority Data

Aug. 25, 2014   (DE) .................. 10 2014 112 090

(51) Int. Cl.
| | |
|---|---|
| *B62D 21/11* | (2006.01) |
| *B62D 29/00* | (2006.01) |
| *B29C 43/16* | (2006.01) |
| *B62D 25/20* | (2006.01) |
| *B29K 23/00* | (2006.01) |

(Continued)

(52) U.S. Cl.
CPC ............. *B62D 29/005* (2013.01); *B29C 43/16* (2013.01); *B62D 21/11* (2013.01); *B62D 25/20* (2013.01);
(Continued)

(58) Field of Classification Search
CPC ....... B62D 21/11; B62D 25/20; B62D 29/005
(Continued)

(56) References Cited

U.S. PATENT DOCUMENTS

| | | | | |
|---|---|---|---|---|
| 4,720,120 A | * | 1/1988 | Shimatani ............... | B60G 3/06 180/316 |
| 7,958,963 B2 | * | 6/2011 | Hornisch ............... | B62D 21/11 180/312 |

(Continued)

FOREIGN PATENT DOCUMENTS

| | | |
|---|---|---|
| CN | 101263043 A | 9/2008 |
| CN | 103153761 A | 6/2013 |

(Continued)

OTHER PUBLICATIONS

Chinese Patent Office Action for Application No. 201510524928.4, dated Feb. 27, 2017, 11 pages.

*Primary Examiner* — Faye M Fleming
(74) *Attorney, Agent, or Firm* — Hauptman Ham, LLP

(57) ABSTRACT

The invention relates to a subframe for a motor vehicle, comprising an upper shell, a lower shell made from a fiber-reinforced plastic and a rib structure for stiffening the upper shell, wherein the upper shell is composed of a metallic material and the rib structure is composed of a plastic reinforced with short fibers and is formed integrally from the lower shell. The invention furthermore relates to a method for producing a subframe, wherein the lower shell together with the rib structure connected integrally therewith is formed from a stack of plies of a fiber-reinforced ther- (Continued)

moplastic and joined to an upper shell made from a metallic material.

18 Claims, 8 Drawing Sheets

(51) Int. Cl.
  *B29K 77/00* (2006.01)
  *B29K 105/08* (2006.01)
  *B29K 105/12* (2006.01)
  *B29K 105/00* (2006.01)
  *B29L 31/30* (2006.01)

(52) U.S. Cl.
  CPC ...... *B29K 2023/12* (2013.01); *B29K 2077/00* (2013.01); *B29K 2105/0809* (2013.01); *B29K 2105/12* (2013.01); *B29K 2105/256* (2013.01); *B29L 2031/3002* (2013.01)

(58) Field of Classification Search
  USPC .................................................. 280/124.109
  See application file for complete search history.

(56) References Cited

U.S. PATENT DOCUMENTS

| | | | |
|---|---|---|---|
| 8,246,061 B2 * | 8/2012 | Kang | B62D 21/11 180/232 |
| 8,936,302 B2 * | 1/2015 | Miyahara | B62D 21/00 296/203.01 |
| 2006/0284449 A1 * | 12/2006 | Miyahara | B62D 21/11 296/204 |
| 2013/0168939 A1 | 7/2013 | Buschjohann et al. | |
| 2013/0249250 A1 * | 9/2013 | Ohhama | B62D 21/11 296/204 |
| 2014/0232143 A1 | 8/2014 | Renner et al. | |
| 2015/0353135 A1 * | 12/2015 | Wolf | B62D 21/11 280/781 |

FOREIGN PATENT DOCUMENTS

| | | |
|---|---|---|
| DE | 102006017225 A1 | 10/2007 |
| DE | 102008006006 A1 | 7/2009 |
| DE | 102010037459 A1 | 3/2012 |
| DE | 102011115387 A1 | 5/2012 |
| DE | 102011085383 A1 | 5/2013 |
| EP | 2399727 A1 | 12/2011 |
| EP | 2578473 A1 | 4/2013 |

* cited by examiner

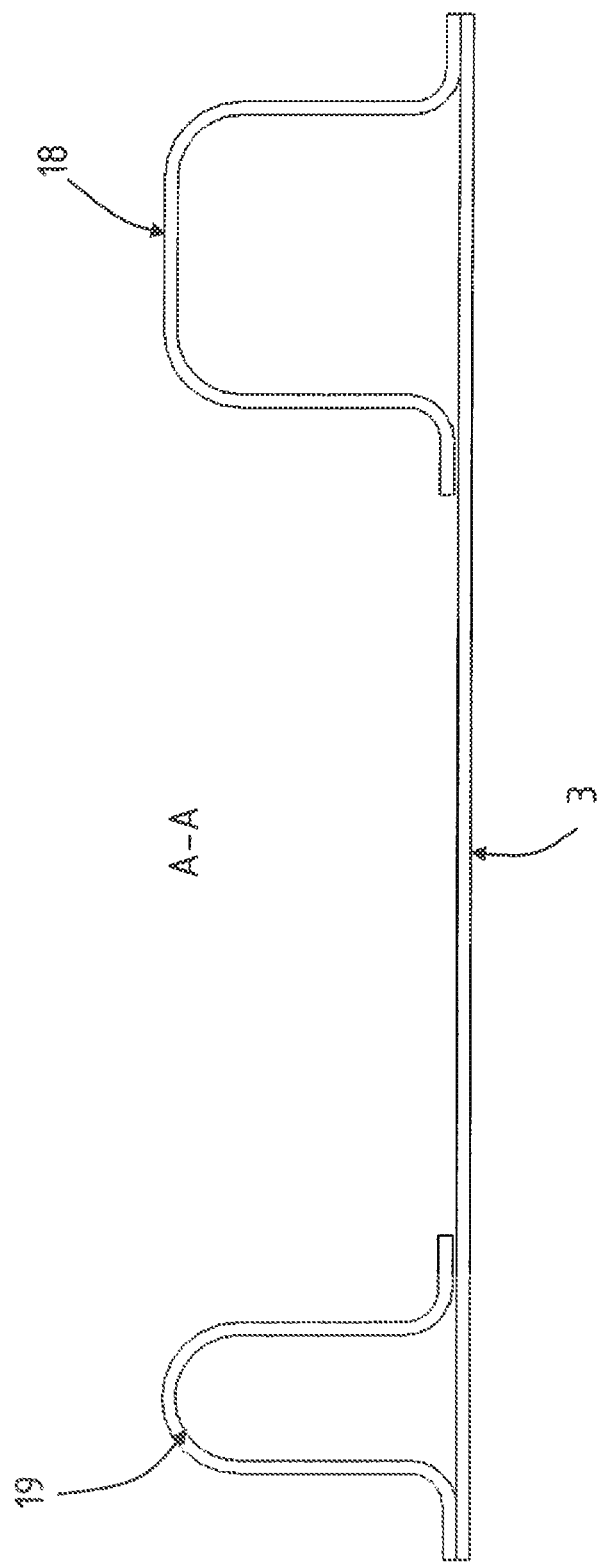

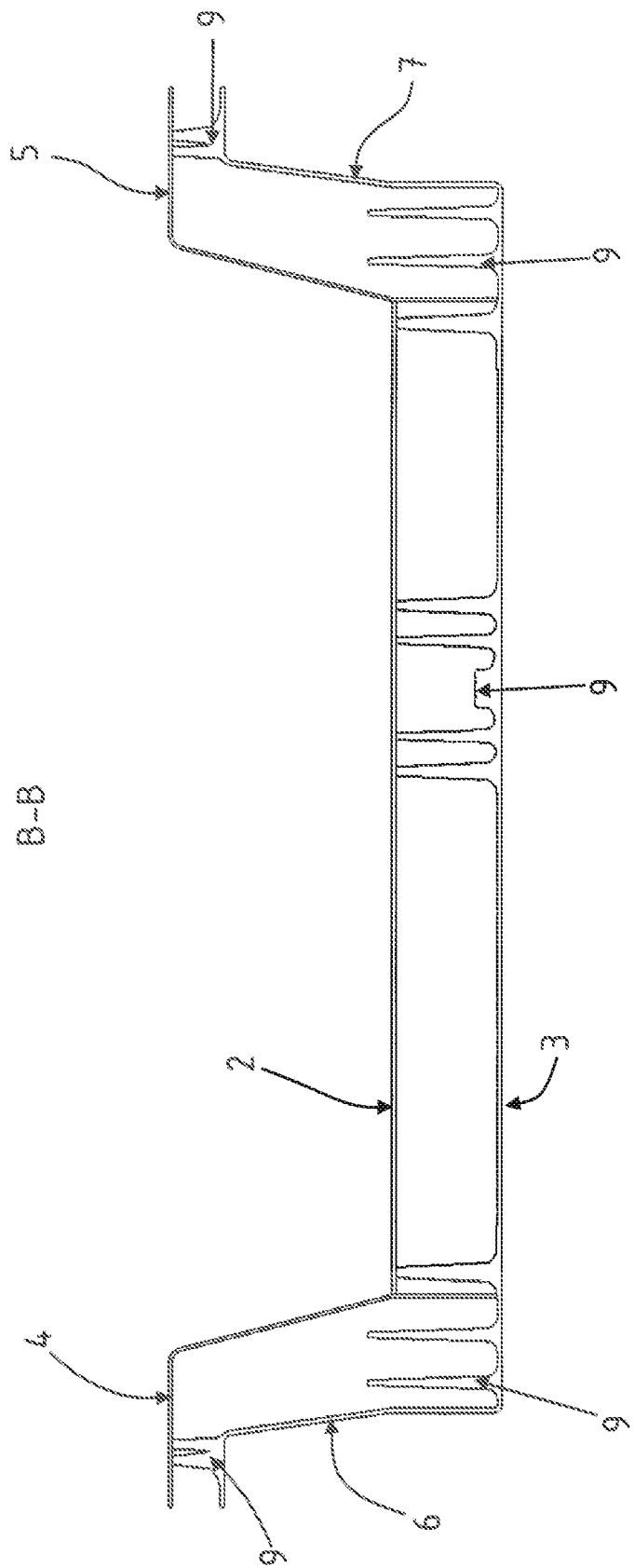

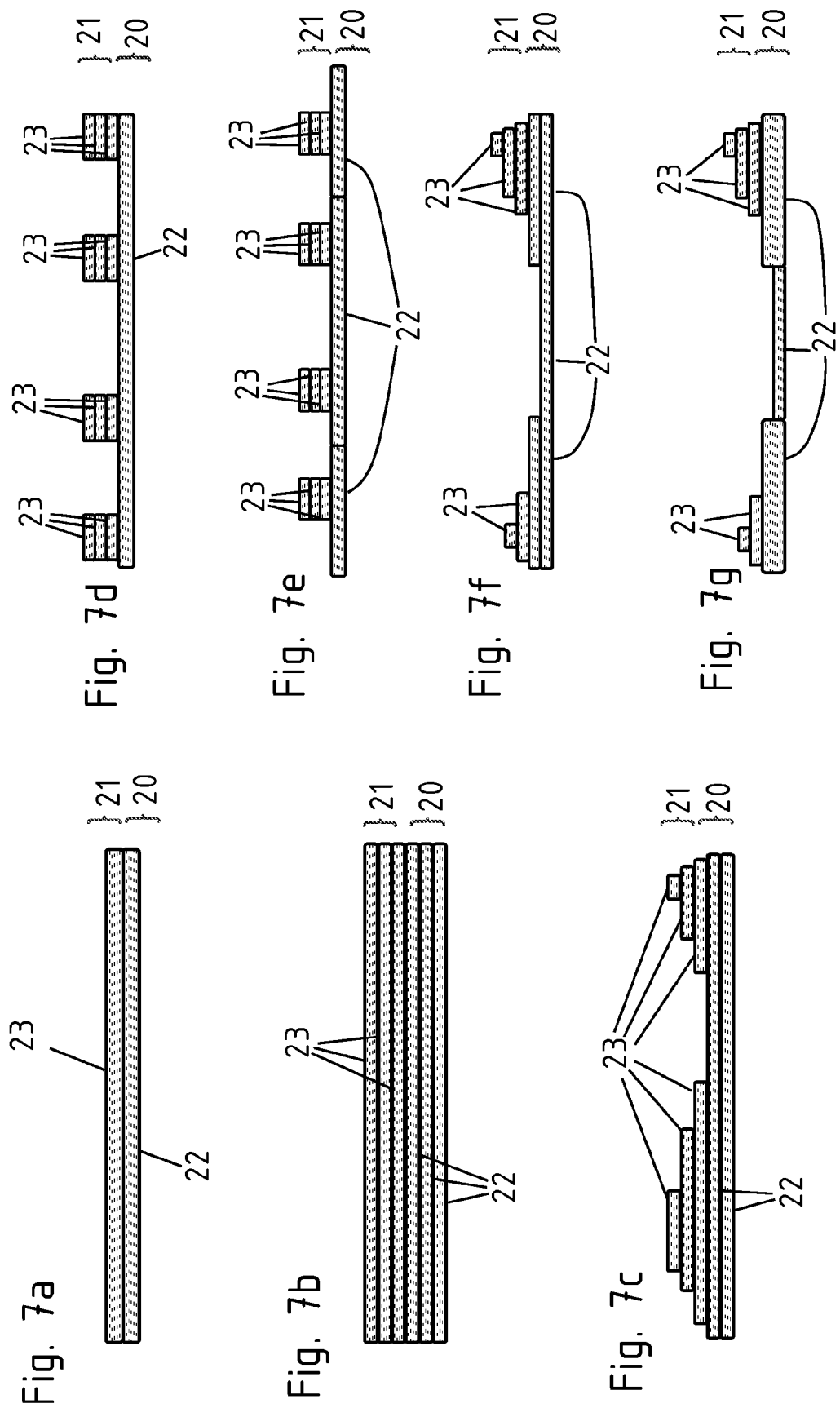

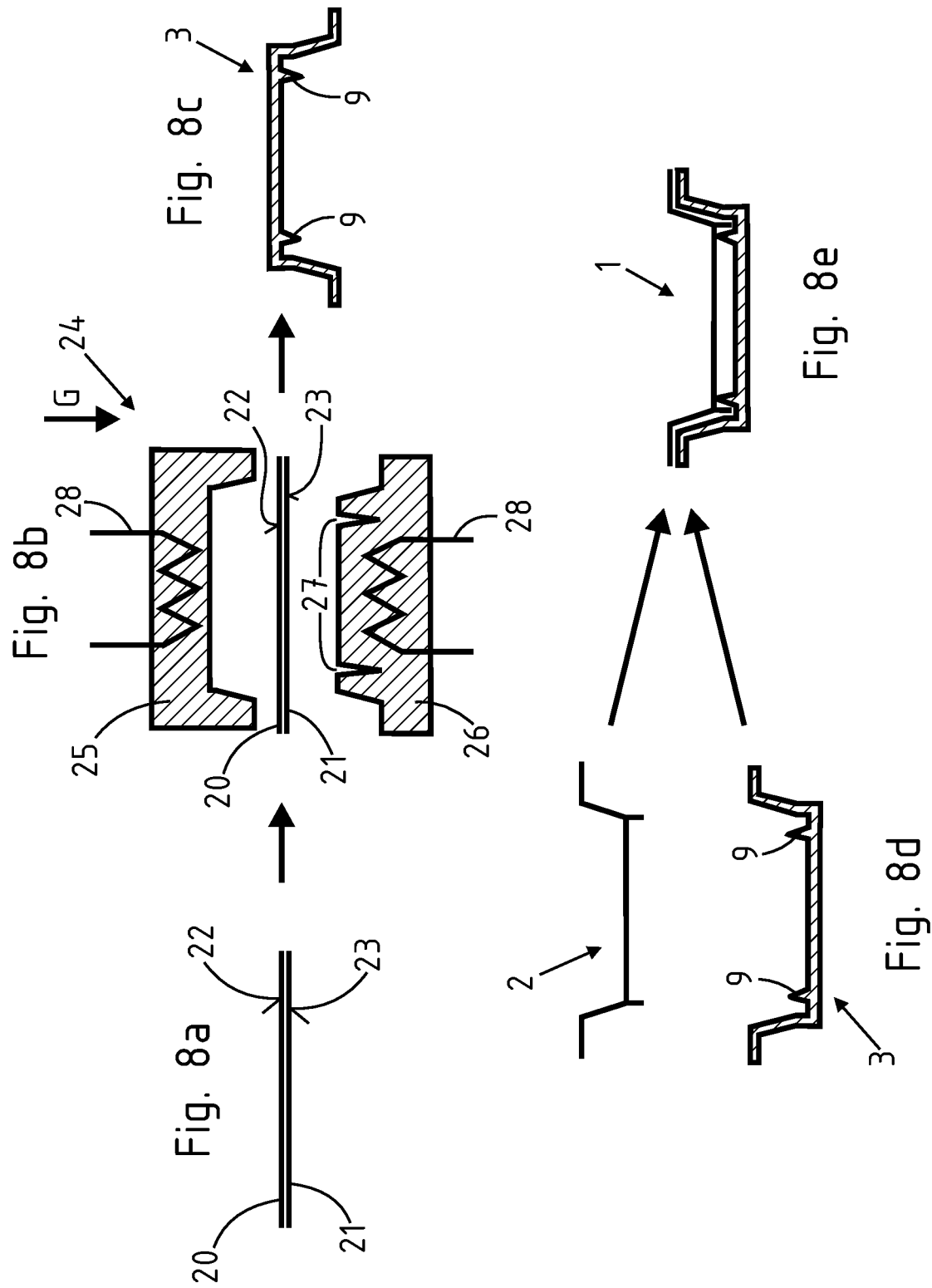

SUBFRAME FOR A MOTOR VEHICLE AND METHOD FOR PRODUCING A SUBFRAME

RELATED APPLICATIONS

The present application claims priority of German Application Number 102014112090.6, filed Aug. 25, 2014, the disclosure of which is hereby incorporated by reference herein in its entirety.

The invention relates to a subframe for a motor vehicle, comprising an upper shell, a lower shell made from a fiber-reinforced plastic and a rib structure for stiffening the upper shell. The invention furthermore relates to a production method for a subframe of the type in question.

A primary aim in modern motor vehicle construction is to design motor vehicle bodies which are as light as possible in order thereby to greatly reduce $CO_2$ emissions and pollution of the environment. For this reason, plastics materials, which, in particular, can be fiber-reinforced, and high- and ultrahigh-strength steel materials and aluminum materials are increasingly being used in motor vehicle construction.

Lightweight construction is also sought in the region of the running gear, wherein a weight saving, in particular through the use of suitable materials and through the use of sheet metal shells in construction, wall reduction and similar measures, is achieved in the area of the steel components. However, further progress in lightweight construction can be made especially through the use of plastics materials. Thus, EP 2 578 473 A1 discloses a subframe made of plastic which comprises cross-struts and longitudinal struts. The subframe is constructed from two half shells made from plastic, wherein at least one of the half shells is stiffened by means of reinforcing ribs within the cross-struts and longitudinal struts. The material used is a fiber-reinforced plastic.

As against the advantage of low weight, there is the fact that a subframe of this kind is relatively expensive owing to the materials used. From a technological standpoint, it is disadvantageous that the rigidity of plastics within a relevant price range does not meet the requirements as regards driving dynamics. Moreover, some plastics tend to break under load or when overloaded. As a result, the rigidity of the subframe is lost and there is the risk that consequential damage will be caused or that the vehicle will become uncontrollable during an accident owing to the structure becoming unstable.

Given this prior art, it is the object of the present invention to provide a subframe for a motor vehicle which is of weight-saving design and is simple to produce and furthermore avoids the disadvantages of the prior art. It is furthermore the object of the present invention to provide a corresponding production method for a subframe for a motor vehicle.

The object as it pertains to a product is achieved by a subframe as claimed in patent claim 1. Special embodiments of the subframe according to the invention form the subject matter of patent claims 2 to 11.

The object as it pertains to a method is achieved by a method for producing a subframe as claimed in patent claim 12, wherein special embodiments of the method are described in claims 13 to 18.

A subframe according to the invention for a motor vehicle comprises an upper shell, a lower shell made from a fiber-reinforced plastic and a rib structure for stiffening the upper shell, wherein the upper shell is composed of a metallic material and the rib structure is composed of a plastic reinforced with short fibers and is formed integrally from the lower shell.

In the context of the invention, "integrally" means that the lower shell and the rib structure are fused together. In particular, both are composed of the same plastic and, in this sense, are therefore formed from a unitary material, although the fiber materials can differ. Thus, it is possible to use not only short fibers but also woven fibers or non-crimp fibers or other continuous fibers for the lower shell.

The use of the upper shell made from a metallic material, in particular, eliminates the technical disadvantages of the cited prior art which have just been described. In the event of an accident, the upper shell made from metallic material may be damaged and bent but is sufficiently ductile as compared with plastics used in the vehicle, thus ensuring that the upper shell does not break. The result is that, although the overall subframe is damaged, it still has adequate stiffness and therefore the overall running gear structure does not become unstable.

At the same time, the lower shell made from fiber-reinforced plastic contributes to a major reduction in the weight of the overall subframe. The rib structure, which is formed integrally from the lower shell, gives the overall structure additional stability which is, in particular, adequate for the loads during driving.

By means of the multi-material system described consisting of metal and fiber-reinforced plastic, the positive properties of the respective groups of materials are combined. Through the use of high- and ultrahigh-strength steel materials or high-strength aluminum alloys (5000 or 6000 series aluminum alloys), it is possible to produce the upper shell in an extremely weight-saving manner in a very thin-walled embodiment. Through the local use of the fiber composite materials in the lower shell and the rib structure, a further weight advantage is created and, through the selective use of the material, an extremely low-cost subframe is produced.

The upper shell made from a metallic material forms, as it were, the shape-defining feature of the overall structure, whereas the fiber-reinforced plastic is used for stabilization and stiffening. In addition, the lower shell makes possible functional integration as an underbody protector or as a shear panel. These two additional aspects are particularly important when the lower shell is of substantially flat and continuous configuration and completely closes off the upper shell. However, these specific embodiments are not compulsory but must be viewed in the context of the overall structure and/or customer requirements.

A thermoplastic, in particular polypropylene or polyamide, is preferably used as a matrix material for the fiber-reinforced plastics. To enable the rib structure for stiffening the upper shell to be made as fine as possible, short fiber material is used to produce it. In the context of the invention, "short fibers" are taken to mean fiber materials with a length of 0.1 millimeters up to 10 centimeters. In particular, it is possible within the context of the invention for the short fibers or short fiber material to be in the form of randomly oriented fibers or fibers oriented in a generally anisotropic way. The term "short fibers" is to be contrasted with the aligned fibers in woven or non-crimp fiber materials, where the fibers generally have a length of 10 cm or more. The term "continuous fibers" is then used.

The usual materials may be considered as base stock for the fibers. By way of example and with no intention to be restrictive, these are glass, carbon, basalt etc. The appropriate material in each case is selected according to the requirements of the subframe.

In particular, the upper shell has the task of accommodating fastenings for other attached components, such as links, the steering gear and the antiroll bar. Attachment to the rest of the body is also achieved via the upper shell. In a preferred embodiment, the upper shell therefore has attachment points for vehicle parts, wherein at least two of the attachment points are designed as attachment towers. As a particularly preferred option, the attachment towers are preferably designed as separate components.

The attachment towers are used, in particular, to attach the subframe to the remainder of the vehicle structure. They project far beyond the remainder of the subframe and are extremely difficult to produce integrally with the remainder of the subframe in a forming process. Owing to the high degrees of forming which are necessary in said process, there is a very high risk that the metallic material will crack at these points during the forming process. The attachment towers are therefore preferably designed as separate components, which are connected to the upper shell, preferably materially, by means of a joining operation, e.g. a welding operation or a brazing operation. The attachment points for other running gear parts can also be reinforced by metal sleeves or metal inserts in order to facilitate fastening and to enable dynamic loads to be compensated more effectively.

Another preferred embodiment of the invention envisages that the lower shell has stiffening sections, which project into the attachment towers at least in some region or regions. The lower shell of the subframe according to the invention is very largely of flat design. This means that the lower shell does not exhibit any major degrees of forming. In comparison, however, the attachment towers projecting beyond the subframe present particular challenges as regards stiffness under dynamic loading. The lower shell therefore has sections which are bent toward the upper shell, with the result that said sections project into the attachment towers and provide additional stiffening for the latter. However, this is not achieved through local forming of the fiber-reinforced plastic per se; instead, the semifinished product on which the lower shell is based is preferably configured in such a way that the stiffening sections which support the attachment towers are produced during the forming operation.

As a further preferred option, the rib structure is of optimized design for the loads encountered during driving. This means, in particular, that the rib structure is preferably formed in the region of the attachment points. During driving, there are continuous dynamic loads on the individual components of the running gear, such as links, antiroll bars etc., caused by steering actions and cornering. The forces acting there are absorbed by the subframe, in particular, and, at that location, very particularly by the attachment points of the corresponding running gear parts on the subframe. This means that particular requirements as regards stiffness are imposed on these points of the subframe. Thus, the rib structure is designed in such a way that it provides special stiffening for the regions in which the attachment points of the upper shell are situated, in particular. This has the consequence that not every cavity between the upper shell and the lower shell is stiffened or filled by the rib structure. This leads to a saving of material for the rib structure, which likewise, once again, makes a contribution to weight saving. On the other hand, the subframe is thereby also optimized in terms of costs inasmuch as the expensive fiber composite material is used only at those points where it is really necessary.

For the same reasons, the lower shell preferably has a locally different shell thickness. The fiber composite material is thereby used in a manner optimized for the forces which occur and for the design requirements.

As a development of this concept, the lower shell has apertures in a particularly preferred embodiment of the invention. This means that material which is not required is not even used in the first place and thus that the maximum possible weight saving is made. In addition, the apertures in the lower shell have the advantage that no spray can collect within the subframe, which may cause problems as regards the corrosion resistance of the overall component.

Another special embodiment of the subframe according to the invention envisages that the upper shell has at least two longitudinal struts and at least one cross-struts connecting the longitudinal struts. This enables the upper shell to fulfill its purpose as a shape-defining feature of the subframe. At the same time, the likewise expensive high- and ultrahigh-strength materials are used in a selective way here too. The result is a low-cost and load-optimized subframe.

This is furthermore preferably further improved if the longitudinal struts and at least one cross-struts have a U-shaped or V-shaped or hat-shaped cross section. Irrespective of the precise configuration, the cross section should have a high area moment of inertia index.

As a further preference, the fiber reinforcement of the lower shell is a woven fabric or a non-crimp fabric. A person skilled in the art understands the term "woven fabric" to mean a textile material in which aligned fibers with a length of 10 centimeters up to several meters are interwoven. In this case, the textile has a plurality of aligned fibers or fiber bundles with different preferential directions, so that initially a number of preferential directions occur in a woven fabric. In the case of a non-crimp fabric, in contrast, the textile consists of fibers or fiber bundles which are interconnected only by filaments. At the same time, non-crimp fabrics can also be of multiaxial configuration.

Through the use of such long fiber structures, it is possible, in particular, to produce crash-stable components of high stability. Owing to the high stiffness of the lower shell configured in this way, it can act as a shear panel, for example, and can thus contribute to the stability of the overall subframe.

It is also possible within the scope of the invention to use randomly oriented fibers, short fiber materials or similar materials in the lower shell in addition to the long fiber materials, such as woven fabrics or non-crimp fabrics.

Although the fiber-reinforced lower shell serves primarily to stiffen the upper shell together with the rib structure, it can, however, likewise be provided with receptacles for attached components, such as screw-on sleeves. Thus, the lower shell preferably has attachment points for running gear parts which, in particular, are provided with metallic reinforcing elements. Such reinforcing elements can be attachment sleeves made of metal or inserts or screw-on sleeves or similar components, for example.

The upper shell is preferably composed of a light metal, in particular of aluminum. Owing to the low weight of the aluminum in combination with the fiber-reinforced plastics, the use of aluminum or aluminum alloys, especially the high-strength 5000 and 6000 series alloys, offers the greatest potential for weight saving. In principle, it is possible to achieve sheet thicknesses in a range of between 1.5 mm and 3 mm, getting weight savings of up to 20% over a corresponding component composed exclusively of aluminum.

The invention furthermore relates to a method for producing a subframe from an upper shell, a lower shell made from a fiber-reinforced plastic and a rib structure for stiffening the upper shell, having the following method steps:
  providing an upper shell made from a metallic material,
  providing a stack of plies made from a fiber-reinforced plastic having a thermoplastic matrix, wherein a first ply comprises at least one sheet of a first type containing fibers in the form of woven fibers and/or non-crimp fibers and/or short fibers and a second ply comprises at least one sheet of a second type containing fibers in the form of short fibers, heating the stack to a temperature T higher than the melting temperature of the thermoplastic matrix before, during or after the introduction of the stack into an impact extrusion tool, forming the stack in an impact extrusion process, with the result that the first ply is formed into the lower shell and the second ply is formed into the rib structure, wherein the lower shell and the rib structure are formed integrally, removing the lower shell and the rib structure from the mold, joining the upper shell, the lower shell and the rib structure to form the subframe.

The list of these individual method steps does not imply any specific sequence of the individual steps. In particular, the provision of the upper shell made from a metallic material is completely independent of the provision of the stack of plies and the forming thereof in the impact extrusion tool.

The provision of an upper shell made from a metallic material is taken to mean the production of the upper shell, preferably from a blank of aluminum or steel materials. The potential methods used here depend on the material used and on the degree of forming to be produced. In the case of steel materials, hot and cold forming methods are possible. Here, high- and ultrahigh-strength steel materials are used as materials. Aluminum or aluminum alloys can likewise be hot- or cold-formed. In this case, 5000 and 6000 series aluminum alloys are preferably used. After the forming of the upper shell from a blank, it is possible to perform additional steps, such as trimming or machining or other mechanical processing steps.

The stack of plies of a fiber-reinforced thermoplastic is assembled in accordance with the requirements of the final component. The lower shell is subsequently formed from the first ply comprising at least one sheet of the first type. Depending on the envisaged wall thickness of the lower shell, one sheet or several sheets of the first type is/are used here. These sheets of the first type contain fibers in the form of woven fibers and/or non-crimp fibers and/or short fibers. The exact composition depends, in turn, on the boundary conditions of the design. The preferred properties as regards stiffness and formability can be set selectively through the targeted choice of the fiber materials.

The sheets of the first type can also be specially trimmed to size, e.g. in order to be able to form the stiffening sections for the attachment towers.

The ribs of the rib structure for stiffening the upper shell are subsequently formed from the second ply comprising at least one sheet of the second type. Since the rib structure has wall thicknesses of just a few millimeters, short fibers are used here. This makes it possible to shape very fine and precise structures from the fiber-reinforced plastics material.

The use of thermoplastics makes it an extremely simple matter to provide and handle the sheets of the first type and the second type. Thermoplastics, such as polypropylene or polyamide, can be heated and then molded and then harden again.

Depending on the dimensioning, the sheets of the first type and the second type configured in this way are dimensionally stable and partially flexible and are very easy to stack. If appropriate, it is possible to fix the individual sheets to one another by means of an adhesive or binder.

The stack of fiber plies is then heated to a temperature T which is higher than the melting temperature of the thermoplastic matrix. Depending on the material used, the melting temperature is between 160° C. and 260° C. The thermoplastic matrix is then deformable. In this state, the individual plies or sheets stick to one another and are thus also very easy to transport. Heating takes place before, during or after the introduction of the stack of fiber plies into an impact extrusion tool. Heating can take place in an oven for example, e.g. a conveyor oven, before introduction into the tool. It is also conceivable for the stack of fiber plies to be heated using a heating lamp while being introduced by means of a manipulator, and it is also conceivable for the stack of fiber plies to be heated by means of suitable temperature adjustment devices within the tool. In this case, the temperature T is preferably about 50° C. higher than the melting temperature of the thermoplastic matrix since the material is then less viscous and is easier to process in the subsequent impact extrusion operation. Even if the stack of fiber plies is heated before being introduced into the impact extrusion tool, the impact extrusion tool itself is preferably fitted with temperature adjustment devices. With the aid of these devices, it is possible, for example, for the matrix material to be cooled in a controlled manner. In one possible method, the temperature of the impact extrusion tool can be set and held at about 50° C. to 60° C.

In the impact extrusion operation, the first ply is formed to give the lower shell, and the second ply is formed to give the rib structure. In this case, the lower shell and the rib structure are of integral design. Forming takes place in an impact extrusion tool which is provided with the appropriate molding cavities for the rib structure. Here, once again, it will be apparent that the second ply comprising at least one sheet of the second type can likewise be customized according to the requirement for material and the final form of the rib structure. The amount of sheet material used is just sufficient to ensure that the rib structure and the lower shell are formed cleanly and that no excess material is left. This allows extremely rational and economical operation.

Next, the lower shell and the rib structure are removed from the mold, wherein the demolding operation includes not only the removal of the lower shell and the rib structure from the impact extrusion tool but also cooling of the formed semifinished product and the hardening thereof.

Finally, the individual components, namely the upper shell and the lower shell, are joined to the rib structure to form a subframe. All conceivable joining methods are used here. The connection between the individual components can be accomplished materially, positively or mechanically by clinching, riveting or screwing.

The lower shell and the rib structure formed integrally therefrom can be adapted in a customized way through the composition of the stack of plies. In a preferred embodiment of the invention, the at least one sheet of the second type is dimensioned and/or arranged on the first ply in accordance with the material requirement for the rib structure. The at least one sheet of the second type can therefore be much smaller in its dimensions than the sheets of the first type, which form the first ply. In particular, the sheets of the second type are arranged where the rib structure is supposed to be formed subsequently on the lower shell. This can pertain to individual small stacks of sheets of the second type, for example, or, alternatively, to individual sheets of the second type which are arranged spaced apart on the first ply, for example.

In a preferred embodiment, the second ply consequently covers the first ply only in some region or regions.

The first ply too has great variability in its configuration, depending on the design envisaged. Depending on how the lower shell is to be configured, the first ply can be made up of a plurality of different sheets of the first type. Thus, one particular embodiment of the invention envisages that the first ply comprises a plurality of sheets of the first type of different sizes and that these sheets are arranged in such a way that locally different shell thicknesses are produced during the molding of the lower shell.

Now, this does not necessarily mean that the individual sheets of the first type can be arranged in a manner stacked one above the other, such that a locally different shell thickness is produced by virtue of the different two-dimensional extents of the individual sheets of the first type. On the contrary, it is also possible to make provision for sheets of the first type of different thicknesses to be arranged adjacent to one another and thus to produce locally different shell thicknesses during the molding of the lower shell.

As a preferred option, it can furthermore be envisaged that at least one sheet of the first type of the first ply is provided with an aperture before or after stacking. This embodiment of the invention takes further account of the concept of weight saving. It may be the case that there is no requirement for material at all in certain regions of the lower shell, and therefore the lower shell can be provided with an aperture at this point. It is then possible, for example, for one or more sheets of the first type to be trimmed even before the formation of the first ply, or for an aperture to be punched out or milled in, or for some other chip-forming or cutting operation to be employed to produce an aperture. In contrast, it is also possible for a plurality of sheets of the first type to be stacked one on top of the other first of all and then to be provided simultaneously with an aperture with the aid of mechanical machining.

The material cut out or punched out can be recycled and sent back to the production process. As a result, the quantity of waste is minimized in an extremely advantageous way, this being associated with a considerable cost saving, particularly because the materials are relatively expensive.

A preferred embodiment of the invention furthermore envisages that the impact extrusion tool comprises an upper and a lower die, wherein the molding cavities provided for the molding of the rib structure are in the lower die, and the molten matrix of the sheet of the second type flows into said molding cavities with the assistance of gravity during the impact extrusion process. The molten thermoplastic matrix has a low viscosity, allowing it to flow into the molding cavities without problems, even before the actual impact extrusion process begins. This assists and simplifies impact extrusion.

In another embodiment of the invention, attachment points are formed integrally in the lower shell and are provided with metallic reinforcement elements in an additional method step. These reinforcing elements can be metallic attachment sleeves or inserts, for example. In this case, the reinforcing elements can be inserted or pressed into already provided and premolded cavities. However, it is also possible to produce these cavities for the reinforcing elements only by means of subsequent machining. It is also possible to envisage that the reinforcing elements themselves are produced in the plastics material by turning, for example, or produce the receiving cavities only by a cutting action.

Although the actual function of the lower shell and of the rib structure is the stiffening and reinforcement of the upper shell, it is also the case, on the other hand, that plastic, in particular, is especially suitable for molding in the impact extrusion method, making it possible to produce even attachment points that are more complex than is possible with the forming of the metallic material of the upper shell.

In this context, it is also possible to envisage that the attachment points for running gear parts on the lower shell support corresponding attachment points for running gear parts on the upper shell. For example, that holes in the upper shell are arranged in alignment with a blind hole in the lower shell or in the rib structure and that a screw-on sleeve is inserted through both jointly.

Further features and advantages of the invention will become apparent from the drawings and the associated description.

The drawings show a preferred illustrative embodiment and are explained in greater detail in the description of the figures. In this context, identical reference signs relate to identical or similar or functionally identical components.

In the drawings:

FIG. 5 shows a cross section along the line A-A of the subframe according to the invention shown in FIG. 1;

FIG. 6 shows a longitudinal section along the line B-B of the subframe according to the invention shown in FIG. 1, FIGS. 7a to g show various variants of a stack of plies made of fiber-reinforced thermoplastic, and FIGS. 8a to e show a variant of the method for producing a subframe according to the invention, wherein the lower shell is produced of a stack of plies in accordance to FIG. 7a.

Figure 1:
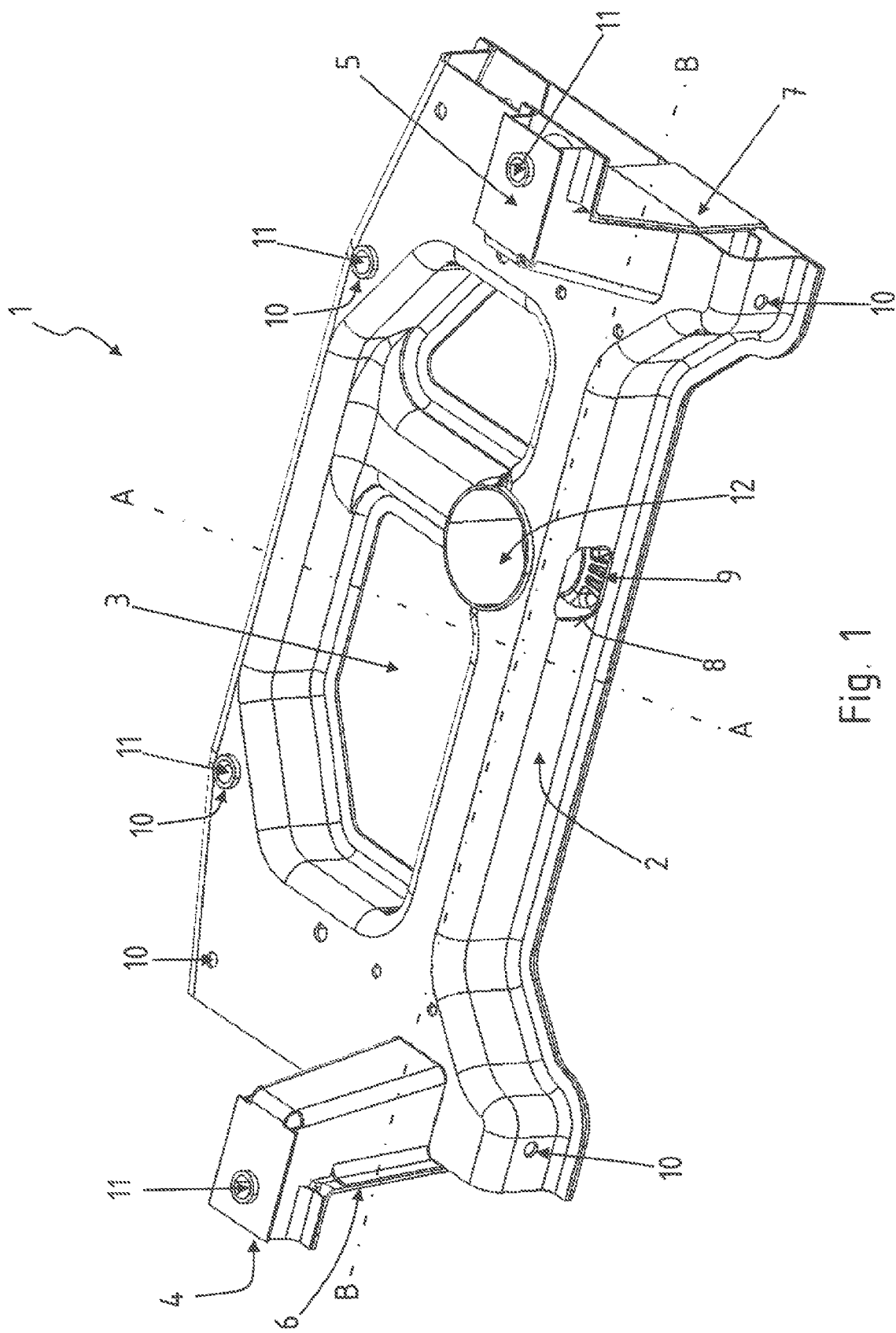
FIG. 1 shows an assembled subframe according to the invention.

An embodiment of an assembled subframe 1 according to the invention is shown by FIG. 1. The subframe 1 comprises an upper shell 2, a lower shell 3 and a rib structure 9 for stiffening the upper shell 2. In FIG. 1, the rib structure 9 can only be seen through the opening 8 since it is otherwise situated completely within the closed shell of the subframe 1. There is a clearer illustration of the rib structure 9 in FIG. 4. In this illustrative embodiment, the upper shell 2 is produced from an aluminum alloy. The lower shell 3 is composed of a fiber-reinforced plastic, wherein the fiber reinforcement contains both long fibers and short fibers. The rib structure 9 is formed integrally from the lower shell 3 and is composed of a plastic reinforced with short fibers. Here, the fibers have a length of up to ten centimeters.

Two attachment towers 4, 5 are furthermore mounted on the upper shell 2. These are used to attach the subframe 1 to the vehicle body. Stiffening sections 6, 7, which project into the attachment towers 4, 5, are formed from the lower shell 3. The lower shell 3 itself is designed as a flat surface without apertures and closes the upper shell 2 from below over the entire area thereof. The stiffening sections 6, 7 are angled upward, i.e. toward the upper shell, relative to the extended-area plane of the lower shell 3 and, for their part, close off the attachment towers 4, 5. The attachment towers 4, 5 are produced as separate components and are connected materially to the upper shell 2. They form specially designed attachment points for other running gear parts and, for this purpose, are provided with attachment sleeves 11. Other attachment points 10 for other running gear parts, e.g. antiroll bars or links, are in some cases likewise provided with attachment sleeves 11 for reinforcement.

Another specially designed attachment point is formed by the bearing 12. This is used to attach a torque support of the engine block and hence to support the torques associated with the engine block.

The upper shell 2 shown here and the attachment towers 4, 5 have sheet thicknesses of 2 mm to 2.5 mm. The lower shell 3 and the rib structure 9 has wall thicknesses around 4 mm. If the overall subframe 1 were manufactured completely from aluminum, the sheet thicknesses for the upper shell 2 and attachment towers 4, 5 would have to be designed to be in a range between 2 mm and 4.5 mm. A corresponding lower shell 3 would have a wall thickness of about 3 mm. Accordingly, the wall thicknesses would be higher for the metallic components. In combination with the lower density of the fiber-reinforced plastic as compared with that of aluminum or an aluminum alloy, this leads to an overall weight saving of around 17% through the use of different materials, which are selected to match requirements.

Here, the upper shell 2 essentially assumes the task of defining the shape. Moreover, further running gear parts, via which forces are introduced into the subframe 1, such as antiroll bars or links, are secured directly on the upper shell 2. The lower shell 3 or rib structure 9 is used to stiffen the upper shell 2. A shear panel function can also be integrated into the lower shell 3.

The embodiment shown here with the lower shell 3 as a full-area component which closes off the upper shell 2 at the bottom additionally acts as a corrosion protector and as a guard against stone impacts.

Figure 2:
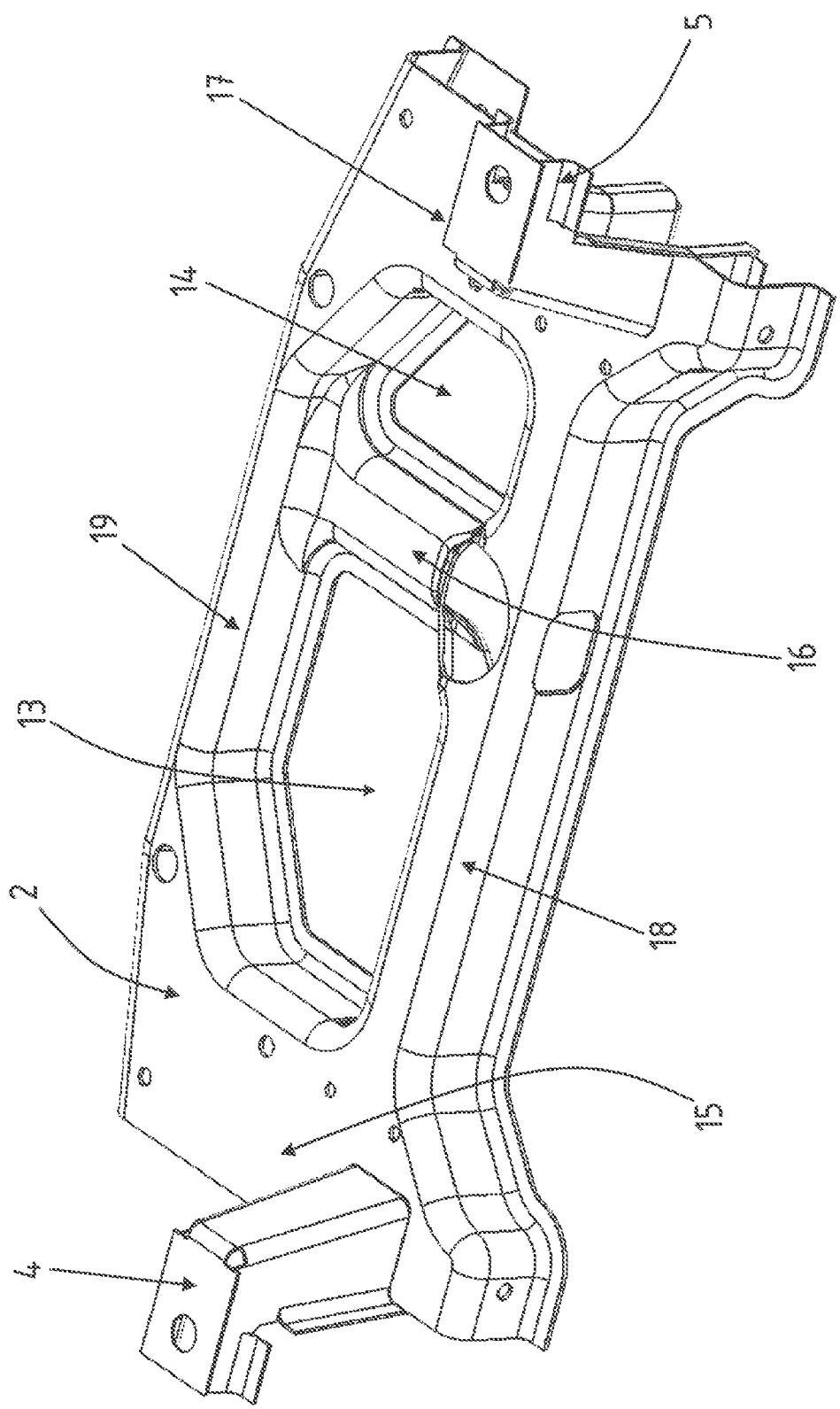
FIG. 2 shows the upper shell of the subframe in isolation from above.

In FIG. 2, the upper shell 2 is shown in isolation. As already mentioned, the attachment towers 4, 5 are designed as separate components and are connected materially to the upper shell 2. The upper shell 2 itself has longitudinal struts 15, 16, 17, which are connected to one another by cross-struts 18, 19. There are apertures 13, 14 between the longitudinal struts 15, 16, 17 and the cross-struts 18, 19. An additional weight saving is possible by means of these apertures 13, 14. The longitudinal struts 15, 16, 17 and the cross-struts 18, 19 each have a substantially U-shaped cross section, as is clear in FIG. 5. FIG. 5 shows a section through a subframe 1 according to the invention along section line A-A in FIG. 1. The U-shaped cross-strut 19 can be seen in FIG. 5, whereas the cross section of cross-strut 18 has more of a hat shape. There, it is once again clear that the lower shell 3 is a full-area structure made from fiber composite material which completely closes off the upper shell 2. The longitudinal struts 15, 17 are configured in such a way that a wall of the U-shaped cross section is cut out. This too serves to avoid excess weight.

Figure 3:
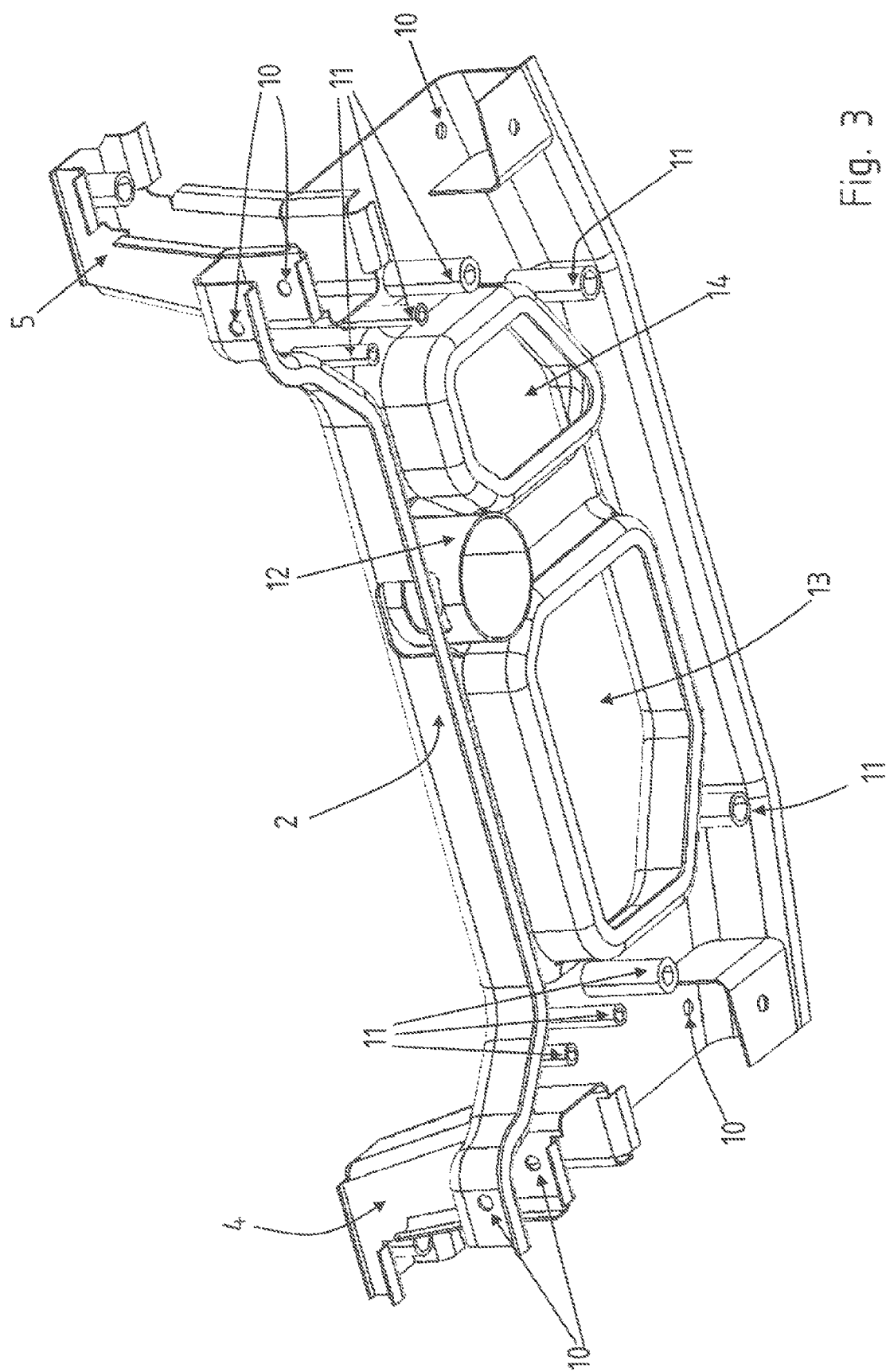
FIG. 3 shows the upper shell of the subframe from below with attachment sleeves.

In FIG. 3, the upper shell 2 is shown from below at an angle. This once again illustrates the use of attachment sleeves 11 for reinforcing the attachment points 10.

Figure 4:
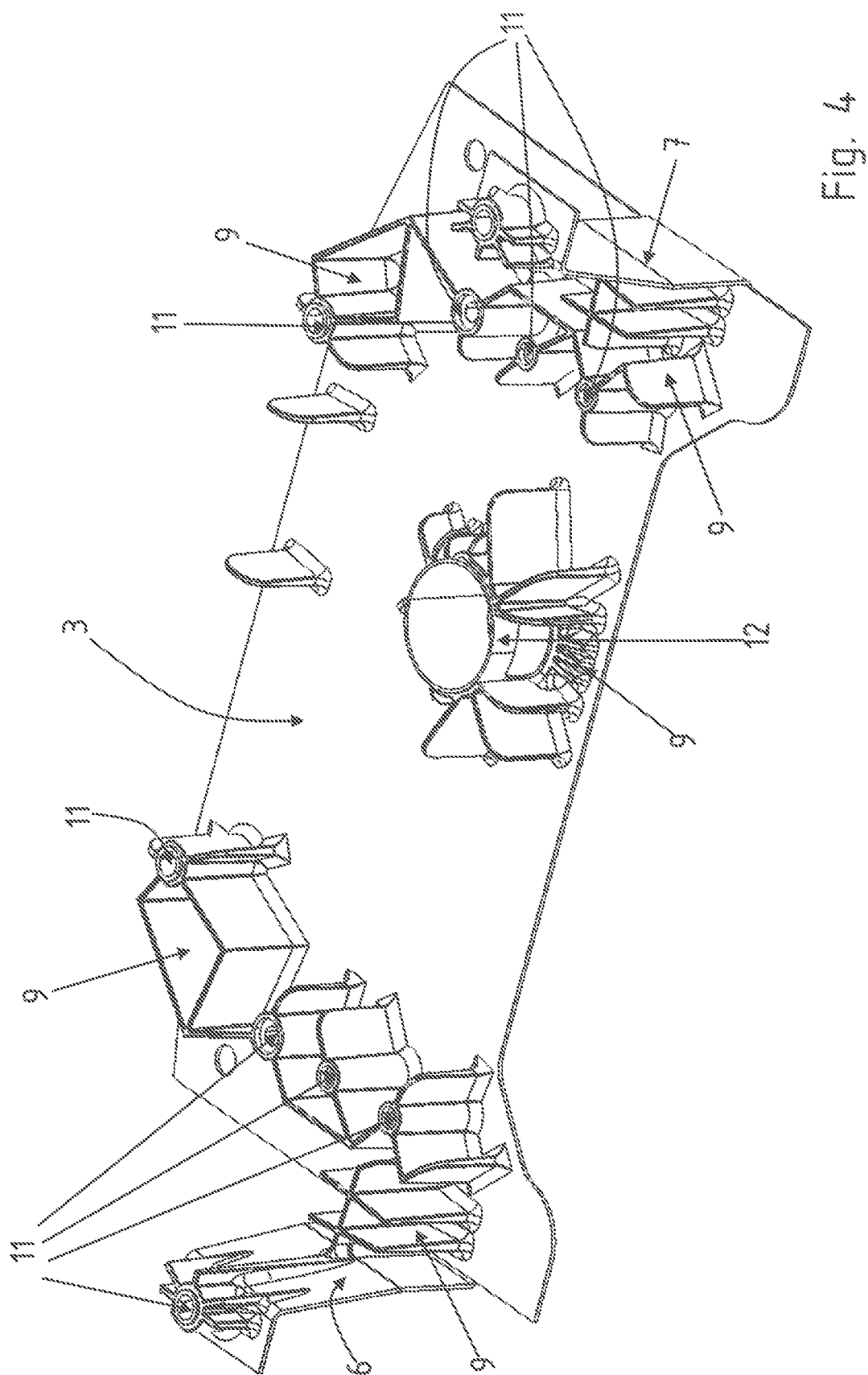
FIG. 4 shows the lower shell with the rib structure.

In FIG. 4, the lower shell 3 is depicted together with the rib structure 9 as a separate integral component. The attachment sleeves 11 are likewise included here for illustrative purposes. The illustration makes clear that the rib structure 9 is formed primarily in the vicinity of the attachment points 10, which are reinforced by the attachment sleeves 11. The running gear components by which forces are introduced into the subframe 1 are secured on the attachment points 10. These points of the subframe 1 are therefore subject to particularly severe dynamic loads and require additional reinforcement. The stiffening rib structure 9 is therefore provided particularly in the region of the attachment points 10. This, in turn, harmonizes with the aim of weight saving and, as a consequence, with a consistent use of material at the necessary points. It is therefore not necessary for all the cavities in the upper shell 2 to be filled and/or stiffened by the rib structure 9. The relatively costly fiber composite material, in particular, is used in a selective manner here, as required.

Another cross section along the line B-B in FIG. 1 is shown by FIG. 6. The section passes through the two attachment towers 4, 5, and also through the upper shell 2 and the lower shell 3. This illustration makes two things clear. On the one hand, it can clearly be seen here that the rib structure 9 is formed integrally from the lower shell 3. On the other hand, the use of the rib structure 9 at the necessary points is clearly evident once again. The reinforcement of the attachment towers 4, 5 by the stiffening sections 6, 7, in particular, is readily apparent here.

The lower shell 3 is produced from a stack of plies of a fiber-reinforced thermoplastic, wherein a first ply 20 comprises at least one sheet of the first type 22 containing fibers in the form of woven fibers and/or non-crimp fibers and/or short fibers and a second ply 21 comprising at least one sheet of the second type 23 containing fibers in the form of short fibers. The first ply 20 is formed to give the lower shell 3 during the impact extrusion process, whereas the second ply 21 is formed to give the rib structure 9. In order to be able to use the fiber material as appropriate to the aim, the stack of plies is produced in a customized way, depending on the embodiments of the lower shell 3 and of the rib structure 9. Many different variant embodiments arise in this context. Different variants of a stack of plies according to the invention are presented by way of example in FIGS. 7a to 7g. However, this list is by no means exhaustive, being intended only to make clear the versatility of the method. Common to all the stacks of plies presented is that they comprise a first ply 20 and a second ply 21. The first ply 20 in each case comprises at least one sheet of the first type 22 and the second ply 21 comprises at least one sheet of the second type 23. Even though the sheets of the first type and of the second type 22, 23 are shown in different sizes and numbers in the individual FIGS. 7a to 7g, different reference signs are not used.

The simplest form of a stack of plies according to the invention is shown by FIG. 7a. Here, the first ply 20 comprises just one sheet of the first type 22 and the second ply 21 comprises just one sheet of the second type 23.

In FIG. 7b, the first ply 20 and the second ply 21 each comprise a plurality of sheets of the first type 22 and second type 23 respectively. Especially when unidirectional materials, such as woven fabrics or non-crimp fabrics, form the fiber reinforcement in the sheet of the first type 22, sheets 22 can be stacked with these fiber materials in different orientations. By means of the different preferential directions of the sheets of the first type 20, it is thereby possible to introduce an additional variability as regards the material properties.

As shown in FIGS. 1 to 6, however, it is occasionally not necessary to form the rib structures 9 over the full area of the entire lower shell 3. On the contrary, it is advisable to use the short fiber plastics material for the rib structure 9 in a manner appropriate to the aim and to arrange it in such a way, even before the forming process, that the rib structures 9 can be produced in as simple a manner as possible. One example of this is shown in FIG. 7c. Here, the first ply 20 is formed by two sheets of the first type 22. The second ply 21 likewise comprises a plurality of plates of the second type 23, which, although they all have the same thickness, are of different sizes in terms of their surface dimensions. Here, the sheets of the second type 23 are dimensioned and arranged on the first ply 20 in accordance with the requirement for material for the rib structure 9. In this case, the second ply 21 covers the first ply 20 only partially.

A similar embodiment to that in FIG. 7c is shown by FIG. 7d. Here, the first ply 20 comprises just one sheet of the first type 22, but this has a greater thickness than, for example, the sheets of the first type 22 in FIG. 7c. Once again, the sheets of the second type 23 are arranged locally on the first ply 20 where the rib structure 9 is subsequently to be formed.

It is not compulsory to provide for the sheets of the first type 22 and the sheets of the second type 23 to be arranged one above the other within the first ply 20 or the second ply 21. On the contrary, it is also possible to arrange the individual sheets of the first type 22 or second type 23 adjacent to one another, as shown in FIG. 7e, for example. Here, the first ply 20 comprises three sheets of the first type arranged adjacent to one another.

In order to adapt the lower shell 3 to the loads to be expected or to design specifications, provision can be made for the lower shell 3 to have a different shell thickness locally. This can be taken into account in two ways during the production of the stack of plies. In FIG. 7f, the first ply 20 comprises a sheet of the first type 22, which forms a large-area base sheet. A plurality of sheets of the first type 22 of smaller dimensions is arranged on said base sheet. This is precisely at the locations at which the lower shell 3 is supposed subsequently to have a locally greater shell thickness.

The same effect can be achieved if a plurality of sheets of the first type 22 of different thicknesses is arranged adjacent to one another, as shown in FIG. 7g.

FIGS. 8a to 8e show the method for producing a subframe 1 according to the invention in a schematic view. In the shown example, the lower shell 3 as well as the rib structure 9 are each produced by two plies 20, 21, wherein the first ply 20 consists of sheets of the first type 22 and the second ply 21 consists of sheets of the second type 23. The plies 20, 21 shown here are identical to the ones shown in FIG. 7a. In the shown embodiment of the production method both plies 20, 21 are placed into the impact extrusion tool 24 together and are heated there to a temperature which is higher than the melting temperature of the thermoplastic matrix. Subsequently both plies 20, 21 are formed and merged within the impact extrusion process. Within this process the first ply 20 forms the lower shell 3 and the second ply 21 forms the rib structure 9, wherein the lower shell 3 and the rib structure 9 are formed in one piece during the impact extrusion process.

FIG. 8b shows that the impact extrusion tool 24 consists of an upper tool 25 and a lower tool 26. The upper tool 25 as well as the lower tool 26 inhibit a heating station 28 in the shown embodiment, in order to heat up both plies 20, 21. In further embodiments which are not shown, it is conceivable that the heating of the plies 20, 21 is carried out by external heating stations before or while both plies are placed into the impact extrusion tool 24. In the shown embodiment of the method according to the invention the lower tool 26 possess mold cavities 27 in order to form the rib structure 9. By heating the ply to the desired temperature the matrix of the sheet of the second type 23 which contains fibers in the form of short fibers, is molten and flows into the mold cavities 27, so that rib structure 9 is built while forming. In the shown embodiment of the method according to the invention the production of the rib structure 9 is support by the force of gravity G.

Subsequently the rib structure 9 together with the lower shell 3 which are produced as one piece, can be removed out of the impact extrusion tool 24. This is shown by FIG. 8c. FIGS. 8d and 8e further show that the upper shell 2 which is provided separately, the lower shell 3 and the rib structure 9 are assembled to the subframe 1.

The assembling can be done firmly bonded, by form-locking or mechanical-locking manner, especially by clinching, riveting or a screw connection.

In further not shown embodiments the production of the subframe 1 is realized by a plies of sheets which are shown by FIGS. 7b to 7g in further detail. Especially a first ply 20 and a second ply 21 are used which have different configurations. To avoid unnecessary repetition, reference is made to the description to the FIGS. 7b to 7g.

Further not shown, in an additional embodiment of the method according to the invention it is conceivable that the lower tool 26 is provided with further cavities 27 to enable more complex rib structures 9. Two embodiments of a complex rib structure 9 are shown in FIGS. 4 and 6.

REFERENCE SIGNS

1—subframe
2—upper shell
3—lower shell
4—attachment tower
5—attachment tower
6—stiffening section
7—stiffening section
8—opening
9—rib structure
10—attachment point
11—attachment sleeve
12—bearing
13—aperture
14—aperture
15—longitudinal strut
16—longitudinal strut
17—longitudinal strut
18—cross-strut
19—cross-strut
20—first ply
21—second ply
22—sheet of the first type
23—sheet of the second type
24—impact extrusion tool
25—upper tool
26—lower tool
27—mold cavities
28—heating station
G—gravity

The invention claimed is:

1. A subframe for a motor vehicle, comprising:
an upper shell,
a lower shell made from a fiber-reinforced plastic, and
a rib structure for stiffening the upper shell, wherein the upper shell is composed of a metallic material and the rib structure is composed of a plastic reinforced with short fibers and is integrally formed as one piece with the lower shell.

2. The subframe as claimed in claim 1, wherein the upper shell has attachment points for vehicle parts, wherein at least two of the attachment points are designed as attachment towers.

3. The subframe as claimed in claim 2, wherein the lower shell has stiffening sections, which project into the attachment towers at least in some region or regions.

4. The subframe as claimed in claim 1, wherein the rib structure is formed in the region of the attachment points.

5. The subframe as claimed in claim 1, wherein the lower shell has a locally different shell thickness.

6. The subframe as claimed in claim 1, wherein the lower shell has apertures.

7. The subframe as claimed in claim 1, wherein the upper shell has at least two longitudinal struts and at least one cross-strut connecting the longitudinal struts.

8. The subframe as claimed in claim 7, wherein the longitudinal struts and the at least one cross-strut have a U-shaped or V-shaped or hat-shaped cross section.

9. The subframe as claimed in claim 1, wherein the fiber reinforcement of the lower shell is a woven fabric or a non-crimp fabric.

10. The subframe as claimed in claim 1, wherein the lower shell has attachment points for running gear parts.

11. The subframe as claimed in claim 1, wherein the upper shell is composed of a light metal.

12. A method for producing a subframe comprising an upper shell and a lower shell made from a fiber-reinforced plastic and a rib structure for stiffening the upper shell, comprising the following method steps:

providing an upper shell made from a metallic material, providing a stack of plies made from a fiber-reinforced plastic having a thermoplastic matrix, wherein a first ply comprises at least one sheet of a first type containing fibers in the form of woven fibers and/or non-crimp fibers and/or short fibers and a second ply comprises at least one sheet of a second type containing fibers in the form of short fibers, heating the stack to a temperature T higher than the melting temperature of the thermoplastic matrix before, during or after the introduction of the stack into an impact extrusion tool, forming the stack in an impact extrusion process, with the result that the first ply is formed into the lower shell and the second ply is formed into the rib structure, wherein the lower shell and the rib structure are formed integrally, removing the lower shell and the rib structure from the mold, joining the upper shell, the lower shell and the rib structure to form the subframe.

13. The method as claimed in claim 12, wherein the at least one sheet of the second type is dimensioned and/or arranged on the first ply in accordance with the material requirement for the rib structure.

14. The method as claimed in claim 12, wherein the first ply is covered only in some region or regions by the second ply during the stacking of the plies.

15. The method as claimed in claim 12, wherein the first ply comprises a plurality of sheets of the first type of different sizes and said sheets are arranged in such a way that locally different shell thicknesses are produced during the molding of the lower shell.

16. The method as claimed in claim 12, wherein the at least one sheet of the first type of the first ply is provided with an aperture before or after stacking.

17. The method as claimed in claim 12, wherein the impact extrusion tool comprises an upper and a lower die, wherein the molding cavities provided for the shapes of the rib structure are in the lower die, and the molten matrix of the sheet of the second type flows into said molding cavities with the assistance of gravity (G) during the impact extrusion process.

18. The method as claimed in claim 12, wherein attachment points are formed integrally in the lower shell and are provided with metallic reinforcement elements in an additional method step.

* * * * *